July 30, 1940.　　　H. S. FIELDER ET AL　　　2,209,516
METHOD FOR PRODUCTION OF ARTIFICIALLY CULTURED BUTTERMILK
Filed Dec. 1, 1937
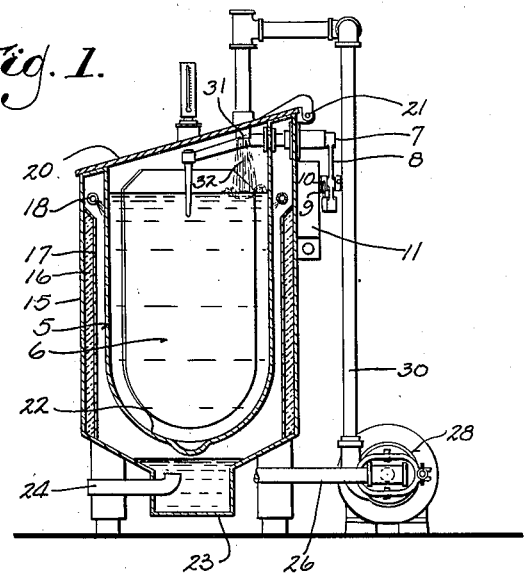
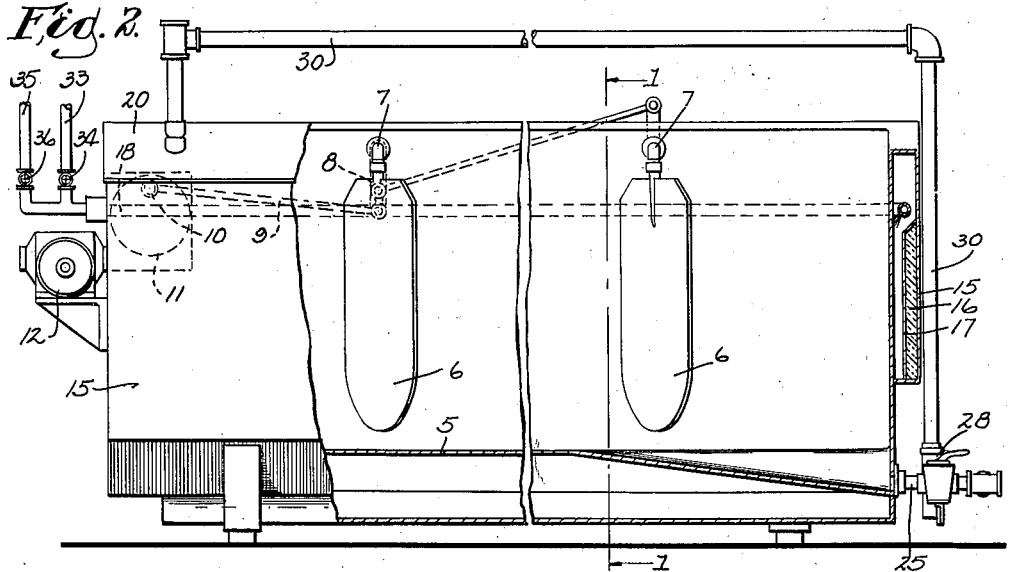
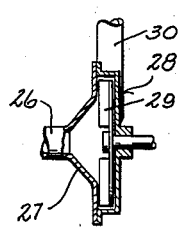
INVENTORS
HAROLD S. FIELDER AND
LATOUR O. OTT
BY
Wheeler, Wheeler & Wheeler
ATTORNEYS Patented July 30, 1940

2,209,516

UNITED STATES PATENT OFFICE 2,209,516

METHOD FOR PRODUCTION OF ARTIFICIALLY CULTURED BUTTERMILK

Harold S. Fielder, La Grange, Ill., and Latour O. Ott, San Francisco, Calif., assignors to Cherry-Burrell Corporation, Wilmington, Del., a corporation Application December 1, 1937, Serial No. 177,400

9 Claims. (Cl. 99—59)

This invention relates to improvements in methods and apparatus for the production of artificially cultured buttermilk, and more particularly to the production of butter flakes from a dairy product containing butter fat.

The apparatus, as disclosed in this application, is fully described and claimed in our co-pending divisional application Serial No. 321,170, filed February 28, 1940.

The objects of the invention include the provision of a novel and improved means for securing and maintaining a proper size of flake in buttermilk by the churning of a dairy product containing butter fat until butter flakes are formed, preventing coagulation or separation while churning or agitating and to produce a desirable new product of attractive texture, color and taste, in which the solid particles remain in suspension after bottling.

More particularly, it is the purpose of the invention to use a combination of mechanical and hydraulic agitation to process a dairy mixture under circumstances enabling the entire operation of processing and churning to be handled in a single container, thereby not merely promoting convenience of manufacture, but yielding a better flavor and texture than is possible where the product is shifted from one container to another and possibly exposed to different metals during production, as well as to reduce the time required in the churning operation.

In the drawing:

Figure 1 is a view showing in transverse section the apparatus used in the practice of this invention.

Figure 2 is a view showing the apparatus in longitudinal section.

Figure 3 is a view showing in axial section the special circulating and agitating pump employed in connection with this invention.

Like parts are identified by the same reference characters throughout the several views.

In accordance with this invention special equipment is preferably used to enable buttermilk to be processed and churned complete in one receptacle. The apparatus preferably comprises an inner tank 5 in which a broad paddle 6 is suspended for oscillation upon the shaft 7. The shaft 7 carries a crank 8 outside of the tank connected by a link or pitman 9 with the crank 10 of a speed reducer 11 operated by motor 12.

The external jacket 15 completely surrounds the tank 5 in spaced relation thereto and is heavily insulated against heat transfer by the layer of insulation 16 which is held in place by an intermediate lining 17 in spaced relation to tank 5. The layer of insulation and the intermediate lining 17 terminate short of the top of the tank 5 and above them is disposed a pipe 18 extending completely about the wall of the tank 5 and provided with nozzle orifices for directing jets of water or steam against the exterior surfaces of tank 5. The upper margins of tank 5 are carried over the upper margins of jacket 15 to enclose the space in which the pipes 18 operate, and a cover 20 hinged at 21 is provided to give access to the interior of the tank.

The tank 5 preferably has a cylindrical bottom at 22 beneath which the jacket 15 is provided with a sump 23 from which the water or other fluid flowing down the exterior surfaces of tank 5 may be withdrawn through the discharge pipe 24.

The tank 5 is provided at one of its ends with a large outlet at 25 communicating through pipe 26 with the conical inlet chamber 27 of a centrifugal pump generically designated by reference character 28. The purpose of providing the flaring inlet chamber 27 is to enable the incoming liquid to pass beyond the "eye" of the pump runner 29 into the path of the blades to receive directly the blade impact. In an ordinary milk handling pump every effort is made to avoid such impact, but in the present case the impact produces desirable agitation and churning effect which breaks up the globules of butter fat and reduces them to minute size subsequently resulting in small butter flakes. In this connection it is interesting to note that too small a pump will not be effective to accomplish this result. The runner must have substantial size in order to produce the smoothing and aid the churning effect upon the liquid which is a desirable objective of the invention.

The discharge pipe 30 leading from the pump 28 passes to the end of tank 5 opposite to that from which the liquid was withdrawn through outlet 25. Moreover, the pipe 30 terminates at 31 at a point which should preferably be at least a foot above the level of liquid in tank 5. The hydraulic impact of the incoming stream 32 with the liquid in tank 5 is a very important factor in reducing the size of the fat globules in effecting the churning action and enhancing the smoothness and homogeneous character of the product.

In the stream of liquid used on this hydraulic operation a certain amount of air will unavoidably be entrained. The motor 12 is therefore maintained in operation during the recirculation of liquid to expel the air upon the contents of tank 5, and reduce the foam on the surface of the liquid in the tank.

The complete method involved in the use of the above described apparatus for the processing of buttermilk is as follows.

Skimmed milk is standardized with separated cream to add to the skimmed milk one half percent to one percent butter fat. The total solids are reduced to approximately 8.2% by adding water. The batch is heated to approximately 185° F. by delivering steam or hot water into pipe 18 from the hot line 33 through valve 34. The heating will, in a machine of conventional size, require about fifty minutes and the temperature should be held at the approximate degree stated for approximately thirty minutes.

Thereupon cold or refrigerated water is introduced into the spray pipe 18 from the cold line 35 through valve 36 to chill the batch to as low a temperature as the temperature of the water will permit, or at least to 72° F. The cooling time in apparatus of ordinary size will be approximately sixty minutes.

2½% to 3% of .87 acid starter is now added to the batch and the batch is mixed thoroughly. The swinging paddle or paddles in the vat 5 may be used for this purpose. The produce is then allowed to stand for approximately fourteen hours, or until the desired acidity is reached. Ordinarily this will lie within a range of .77 to .85 acidity.

At this time it is desired to add butter color to give higher color to the butter granules. The paddles are then set in operation at one half stroke to break up the curd and enough refrigerated water is circulated through the spray pipes to cool the batch to approximately 68° F. for churning.

The pump is now set in operation. The pump has been but briefly described heretofore. It may conveniently correspond to the disclosure of U. S. Patents 1,328,061 and 1,697,487 modified to provide the flaring inlet aforesaid. The outlet valve at 25 is opened full and the product is recirculated through pipe 26, pump 28, and pipe 30 until the churning is completed and the proper size of butter granule and texture is attained. This will require from fifteen minutes to thirty minutes, depending on the amount of butter fat used.

The discharge of the material through space from the terminus 31 of pipe 30 on to the relatively stationary mass of liquid in the machine results in an impact or concussion which is very desirable in securing the best results. In effect the batch is divided by the continuous removal of material from the vat and the continuous concussive delivery of the two masses of material upon each other.

The concurrent and cooperative function of the paddles of the pump runner and the concussion of the material itself, produces the desired texture and churning effect and reduces the fat globules to an extremely fine dimension. While the circulation of the material thus accomplishes all the agitation that is necessary, the paddles 6 are kept in motion at full stroke throughout this operation in order to work the air out of the product in the vat and reduce the foam on the surface of the liquid in the vat.

When the proper size of butter granule is obtained, the batch is cooled in the vat by circulating refrigerated water through the spray pipes sufficient to reduce the temperature of the batch to 45 to 50 degrees F., while keeping the paddles in operation at one half stroke. This will require approximately one and one half hours. The product may then be held in the vat until ready to bottle, or it may be drawn off into cans and held in the refrigerator if desired.

It will, of course, be understood by those skilled in the art that the temperatures and periods of time and acid and butter fat content as stated above, are given merely by way of example and with no intent to limit the invention in any such respect. The initial heating is merely a conventional pasteurization step, and the process upon which novelty is predicated herein is largely concerned with the mechanical and hydraulic treatment of the material by circulating it under the conditions stated. Many phases of the process in this regard are applicable to the performance of dairy operations other than the manufacture of buttermilk, and we understand that unless expressly limited, our claims will be accorded a range sufficient to include equivalent processes.

The product has a finer size of butter granules than any heretofore achieved, and the butter granules stay in suspension better, producing a product of improved flavor not only due to the elimination of air, but also for the reason that the entire batch is speedily completed in one container and associated circulating pipes without coming in contact with numerous metals and other materials. It has been found expedient to use a stainless steel.

We claim:

1. A process of buttermilk manufacture which comprises passing the whey and curd into the path of the blades of a pump runner at points remote from the eye thereof, whereby to subject such whey and curd to mechanical impact while propelling the same.

2. The method of churning a liquid dairy product and producing butter flakes therein which comprises the batch treatment of a liquid dairy product containing butter fat globules in the dispersed phase, withdrawing a portion of the batch in a confined state, and causing the withdrawn portion of the liquid dairy product to be violently impacted onto the surface of the remaining portion of the batch, whereby the globules of the butter fat will be united by the forceful contact of one against another to produce flakes of butter within the batch of churned dairy product.

3. The method of churning a batch of a dairy product containing butter fat and producing butter flakes which comprises the circulation of a portion of the product in a conduit from the batch, and the delivery of the circulated portion through free air onto the surface of the batch.

4. The process of producing buttermilk containing butter flakes which comprises the batch treatment of a dairy product containing butter fat, the removal of a portion of the product from the batch for circulation, the subjecting of the removed portion of the product to mechanical impact agitation in the course of its circulation, and the return of the circulated portion of the dairy product to the batch unconfined from a point above the surface level of the remainder of the batch, whereby to impact the returned portion of the product concussively onto the remaining portion of the batch.

5. The churning of a dairy product containing butter fat to cause the agglomeration of fat globules to form butter flakes which includes making up a batch of dairy product containing butter fat in a vat, pasteurizing the batch in said vat, cooling the batch in said vat, and agglomerating butter fat globules in the batch to form butter flakes by circulating the product from the vat containing the batch back to the batch in said vat, and delivering the circulated product unconfined to the surface of the batch in the vat.

6. The process of making buttermilk which includes making up a batch of dairy product containing butter fat in a vat, pasteurizing the batch in the vat, cooling the batch in the vat, treating the batch to produce curd therein, breaking up the curd, circulating a portion of the batch from the vat to a point substantially above the level of the remainder of the batch contained in the vat, and concussively impacting the circulated portion of said batch against the surface of the remaining portion of the batch in the vat to cause the joining of butter fat globules to form butter flakes.

7. The process of manufacturing artificially cultured buttermilk which comprises pasteurizing a batch of milk containing butter fat globules in a vat, cooling said batch in said vat to incubation temperature, introducing into and mixing of cultures with said batch at said incubation temperature, maintaining the batch in said vat at substantially such incubation temperature for a period of time sufficient to produce the desired degree of acidity and curd, agitating the batch in said vat to break up the curd, removing a portion of said batch from said vat for confined circulation, subjecting said portion to mechanical impact agitation in the course of said confined circulation, whereby to impact fat globules in said circulating portion of said batch concussively together to form butter flakes, and returning the circulated portion of said batch to said vat.

8. The process of manufacturing artificially cultured buttermilk which comprises pasteurizing a batch of milk containing butter fat globules in a vat, cooling said batch in said vat to incubation temperature, introducing into and mixing of cultures with said batch at said incubation temperature, maintaining the batch in said vat at substantially such incubation temperature for a period of time sufficient to produce the desired degree of acidity and curd, agitating the batch in said vat to break up the curd, removing a portion of said batch from said vat for confined circulation, subjecting said portion to hydraulic impact agitation in the course of its circulation, whereby said butter fat globules are impacted together to unite and form butter flakes.

9. The method of producing butter fat flake and lactic acid containing milk product which comprises pasteurizing a batch of milk containing butter fat globules, cooling said batch to incubation temperature, introducing into and mixing of cultures with said batch at said incubation temperature, maintaining the batch at substantially such temperature for a period of time sufficient to produce the desired degree of acidity and curd, agitating the batch to break up the curd, removing a portion of said batch for confined circulation, subjecting said portion to mechanical and hydraulic impact agitation in the course of circulation, whereby to impact butter fat globules in said circulating portion of said batch concussively together to form butter flakes, and churning the batch in the vat to release entrained air therefrom while said circulating operation is in process.

HAROLD S. FIELDER.
LATOUR O. OTT.